United States Patent
Ratilainen et al.

(10) Patent No.: US 7,844,261 B2
(45) Date of Patent: Nov. 30, 2010

(54) NUMBER PORTABILITY AND SERVICES UTILIZING NUMBER RANGE OWNER INFORMATION

(75) Inventors: Rauno Ratilainen, Espoo (FI); Pál Köpösdi, Budapest (HU)

(73) Assignee: Nokia Corporation, Espoo (FI)

( * ) Notice: Subject to any disclaimer, the term of this patent is extended or adjusted under 35 U.S.C. 154(b) by 805 days.

(21) Appl. No.: 10/451,219

(22) PCT Filed: Dec. 21, 2001

(86) PCT No.: PCT/FI01/01148
§ 371 (c)(1), (2), (4) Date: Jun. 20, 2003

(87) PCT Pub. No.: WO02/054786
PCT Pub. Date: Jul. 11, 2002

(65) Prior Publication Data
US 2004/0053604 A1    Mar. 18, 2004

(30) Foreign Application Priority Data
Dec. 29, 2000   (FI) .................................. 20002888

(51) Int. Cl.
*H04M 3/42*   (2006.01)
(52) U.S. Cl. ................ 455/417; 455/418; 455/419; 455/420; 455/422.1; 455/432.1; 455/435.1; 379/80; 379/207.01; 379/142.09; 379/210.01; 379/211.01; 379/220.01; 379/221.01; 379/243; 379/289
(58) Field of Classification Search ............... 455/417; 379/88.01, 207, 211, 220, 221, 243, 289
See application file for complete search history.

(56) References Cited

U.S. PATENT DOCUMENTS

| | | | | |
|---|---|---|---|---|
| 5,553,130 | A | * | 9/1996 | Turner .................. 379/221.08 |
| 5,764,745 | A | * | 6/1998 | Chan et al. ............ 379/221.13 |

(Continued)

FOREIGN PATENT DOCUMENTS

EP    0827319    3/1998

(Continued)

OTHER PUBLICATIONS

ESTI EN 300 347-1 V2.2.2 (Dec. 1999); V Interfaces at the digital Local Exchange (LE); V5.2 interface for the support of Access Network (AN); Part 1: V5.2 interface specification.

*Primary Examiner*—Stephen M D'Agosta
(74) *Attorney, Agent, or Firm*—Harrington & Smith

(57) ABSTRACT

Number portability is a service where a subscriber can keep his old telephone number within a portability cluster and thus retain easy contactibility. Because of number portability, a called address, i.e. B-number, no longer refers to the subscription network/number range owner and the old rule "the number range of the called party reveals the tariff level" is no longer valid. To overcome this defect all intelligent network-like service invocation requests are routed (3-2) via a network node performing a number portability function to the network node controlling the service. The node performing the number portability function performs (3-3) a mapping of the B-number and relays (3-4) the service invocation requests indicating the subscription network/number range owner.

18 Claims, 1 Drawing Sheet

U.S. PATENT DOCUMENTS

| | | | |
|---|---|---|---|
| 5,854,836 A | * 12/1998 | Nimmagadda | 379/221.13 |
| 5,881,145 A | * 3/1999 | Giuhat et al. | 379/221.13 |
| 5,940,492 A | * 8/1999 | Galloway et al. | 379/230 |
| 5,949,870 A | * 9/1999 | Hayduk et al. | 379/221.13 |
| 6,047,056 A | 4/2000 | Patel | |
| 6,130,940 A | * 10/2000 | Wong et al. | 379/221.09 |
| 6,359,979 B1 | * 3/2002 | Wang et al. | 379/221.01 |
| 6,370,151 B1 | * 4/2002 | Bojanic | 370/426 |

FOREIGN PATENT DOCUMENTS

| | | |
|---|---|---|
| WO | 00/21309 | 4/2000 |
| WO | 01/03446 | 6/2000 |

\* cited by examiner

NUMBER PORTABILITY AND SERVICES UTILIZING NUMBER RANGE OWNER INFORMATION

FIELD OF THE INVENTION

The present invention relates to implementing number portability, and more particularly to how to make sure that an intelligent network-like service utilizing a called party address can count on that the called party address indicates the right subscription network/number range owner.

BACKGROUND OF THE INVENTION

Number portability NP is a service where the subscriber can keep his old telephone number within a portability cluster and thus retain easy contactability. In a fixed network, number portability means in that the subscriber can change his location and even his operator and still have the same phone number. In mobile networks, number portability means that a mobile subscriber can change his subscription network without changing his telephone number for terminating traffic. One major feature of NP is that it should have no influence on the services offered. In other words, regardless of whether the number of a subscriber is ported or not, the services offered to the subscriber should be the same. A ported number means a number that has undergone a porting process (i.e. transfer) between locations, operators or subscription networks.

In wireless networks, number portability is usually implemented with a Mobile Number Portability Signalling Relay Function (MNP-SRF) and/or as an IN-based solution e.g. with a CoreINAP interface. In fixed networks, number portability is usually implemented as an IN-based solution. In mobile number portability, the MNP-SRF is mandatory for non-call-related signalling. An intelligent network IN is a network architecture attached to a basic network (fixed or mobile network, for example), which enables faster, easier and more flexible implementation and control of services. This is achieved by moving service control away from the switching centre to a separate functional unit in the intelligent network.

A problem arises when an IN service of the calling subscriber utilizes the number range of a B-number, i.e. the called telephone number, for determining a service parameter, such as tariff level. Because of number portability, the B-number no longer refers to the subscription network/number range owner and the old rule "the number range of the called party reveals the tariff level" is no longer valid. One example of an IN service utilizing the subscription network/number range owner is a prepaid subscription. The prepaid subscription involves no billing in arrears but the account of the prepaid subscription is charged real-time during calls. In solutions based on an intelligent network, a prepaid subscription is charged in phases and usually at least two network nodes participate in the charging. The balance of the account is monitored in a network node controlling the service and called a service control point (SCP). SCP determines, for example, a reserved credit, which is the amount of money reserved from the balance for this call for a certain period of time. The amount of the reserved credit depends on a threshold, which is a network parameter usually expressed as time, and on a price of one time unit for this call. The price is usually determined on the basis of the B-number range owner/subscription network of the B-number. SCP sends the threshold to a service switching point (SSP). The service switching point is a call monitoring network node, for example a mobile switching centre. When for example the time indicated by the threshold has elapsed, SSP reports this to SCP and at the same time requests another threshold. However, the threshold determination described above can not be used with number portability, since the B-number does not necessarily reveal the subscription network/number range owner, and thus it can not be used for determining the time.

Another service similar to the prepaid service with a similar problem is a postpaid service with a limited bill, i.e. a postpaid subscription with a limit indicating the maximum allowed amount to be billed. It differs from the prepaid subscription in that the subscription allows access to chargeable connections or services until the bill reaches the limit.

BRIEF DESCRIPTION OF THE INVENTION

An object of the present invention is to provide a method and an apparatus for implementing the method so as to overcome the above problem. The object of the invention is achieved by a method, a system and network nodes which are characterized by what is stated in the independent claims. Preferred embodiments of the invention are disclosed in the dependent claims.

The invention is based on the idea of routing all intelligent network-like service invocation requests via a network node performing the number portability function to the network node controlling the service. The node performing the number portability function performs the mapping of the B-number and relays the service invocation request with the B-number indicating the address range. In this context the term 'address range' refers to subscription network, number range owner, domain and location of a subscriber. An advantage of the invention is that services utilizing information on the subscription network/number range owner need not be modified to take into account number portability in networks supporting number portability. Thus, there is no need to modify the node controlling the service to request the subscription network/number range owner from the node performing number portability. A further advantage is that the signalling load in the network can be reduced compared to a request made by the node controlling the service, and the service logic in the node controlling the service need not be amended; they can stay as they were before number portability. Another advantage of the invention is that it can also be employed with services utlilizing non-call-related signalling, such as a short message service, as they use the same service invocation mechanism.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

Figure 1:
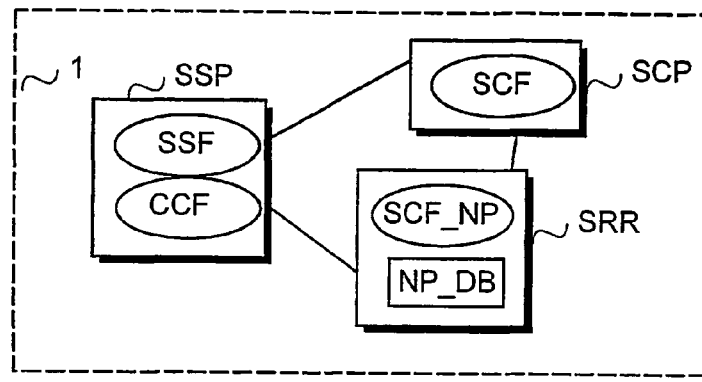
FIG. 1 is a block diagram illustrating some network nodes of a telecommunications system of a first preferred embodiment of the invention.

The present invention can be applied to any communications system supporting number portability. These systems include so-called third generation mobile communications systems, such as the Universal Mobile Telecommunications System (UMTS), and so-called second-generation mobile communications systems, such as the pan-European GSM (Global System for Mobile Communications) and corresponding mobile communications systems, such as DCS 1800 (Digital Cellular System for 1800 MHz) and PCS (Personal Communication System), as well as systems based on the ones mentioned above, such as GSM 2+ systems, and fixed systems, such as the PSTN (Public Switched Telephone Network). The invention can also be implemented in an environment where the actual number portability is implemented with a different platform than disclosed here, such as another MNP-SRF or CSF.

A service providing an intelligent network-like control refers both to services offered by a conventional intelligent network and to services employing intelligent network control principles. Intelligent network control principles in turn refer to a solution where an event checking function handling a call contacts a service control function which may provide the event checking function with instructions affecting the handling of the call. The contact may be a notification or a request. When the contact is a request, the event checking function either interrupts call processing and waits for an instruction(s) or continues call processing and receives the instruction(s) later. The event checking function contacts the service control function on the basis of armed event data in the event checking function. Armed event data can be added and/or deleted at the request of an external service during the call setup process, or even before the call setup process is started. The call can be depicted as a state model visible to the control function, the state model being formed of phases and detection points associated with them. Detection points refer to armed events, i.e. to those call stages and interaction points, if any, where the service control function may influence the call and/or receive information relating to the call. An entity to be controlled may also operate for example on external impulses alone which generate the triggers and/or other armed events, in which case a state model is not necessarily needed. A trigger is an armed event which triggers a service when certain conditions are met, i.e. it activates the service. The controls and operations may also be methods directed to call objects and event notifications associated with them. Examples of protocols employing intelligent network-like call control include Parlay API (Application Protocol Interface), OSA (Open System Architecture) and SIP (Session Initiation Protocol), and naturally different intelligent network protocols, such as WIN (Wireless Intelligent Network) and CAMEL (Customised Applications for Mobile Network Enhanced Logic) application protocol CAP.

Here the term 'call' refers not only to a conventional call, but also to other, possibly virtual, connection states where user data, such as data sessions or packet data, are transferred. Examples of such include packet radio sessions (such as GPRS sessions), VoIP sessions (Voice over IP) and multimedia sessions according to H.323. The user data may comprise various components, such as voice, video and data. The term 'call' also includes the signalling needed to transfer the user data flow and call-like services, which may be unidirectional services, those addressed to a group (or groups), or general broadcasts within a specific area, for example.

In the following, the invention will be described using the CoreINAP terminology of the standard ETSI 300 374-1 without, however, limiting the invention to that kind of a particular intelligent network protocol.

FIG. 1 shows a simplified network architecture, only describing elements and functions that are needed to illustrate the invention. The network nodes illustrated in FIG. 1 are logical units, the implementation of which may differ from the described one. It is obvious to one skilled in the art that the system 1 may also comprise other functions and structures which need not be described in closer detail here.

Network nodes responsible for intelligent network interfaces are called service switching points SSP, and they contain at least a service switching function SSF and a call control function CCF, the combination of which is one example of the event checking function. The call control function CCF is not a function related to the intelligent network, but a standard switching centre function comprising high-level call processing functions of the centre, such as the set-up and release of transmission links. The service switching function SSF provides the interface between the call control function CCF and the service control point SCP. A network node comprising the service switching function SSF detects for example call set-up events, i.e. triggers that may trigger an intelligent network service. An intelligent network service is triggered when certain pre-determined conditions are met. When triggering the intelligent service, SSF sends a service invocation request. The SSP according to the invention is configured to route service invocation requests via SRR (Service Routing Register) as described in greater detail with FIG. 3. SSP is a network node which is typically responsible for connection set-up, such as a switching centre in a basic network or in a mobile communications system. Thus, SSP can be a mobile switching centre MSC or a fixed switching centre FSC, or a network node comprising a call state control function CSCF, for example. Here the service switching point SSP is equal to the functional entity formed by CCF and SSF, so the term SSP will be used hereinafter.

Network elements that include the service control function SCF are called service control points SCP. The service control function is a centralized authority in the intelligent network, which comprises an execution environment for service logic programs, among other things. Here SCF and SCP are equal in value, and hereinafter the term SCP will be used. In connection with an IN-like service, a service logic program is invoked at the service control point SCP, the operation of said program determining the instructions that SCP sends to SSP in each call step. The service control point SCP of FIG. 1 shows the service control point at its simplest. The term 'service control point' covers here different platforms and application servers which control services according to intelligent network-like principles.

The service control function for number portability SCF_NP comprises the necessary control functions for providing the number portability services. SCF_NP can also be a called service relay function (SRF) or a signalling relay function for service invocation requests (SRF-S). The service control point comprising SCF_NP is called SRR (Service Routing Register). The number portability service also requires a database NP_DB (Number Portability Database). In the example illustrated in FIG. 1, the database NP_DB is an internal database, but it may also be an external database and even a decentralized database. SRR may comprise only the number portability functionality, or it may also have capabilities for other purposes.

The system implementing the functionality of the present invention and the network nodes of the system comprise not only prior-art means, but also means for implementing the functions described in greater detail in connection with FIGS. 2 and 3. More specifically, they comprise at least means for routing service invocation requests via SRR to SCP and means for performing number portability mapping at least to the B-number in the service invocation request. The present network nodes comprise processors and memory that can be utilized in the functions of the invention. All changes needed for implementing the invention can be accomplished as added or updated software routines, using application-specific integrated circuits (ASIC) and/or programmable circuits, such as EPLD, FPGA. It is assumed that prior-art means support number portability, i.e. SSP, SRR, HLR and SCP are configured to support number portability and recognize in routing numbers, for example.

Figure 2:
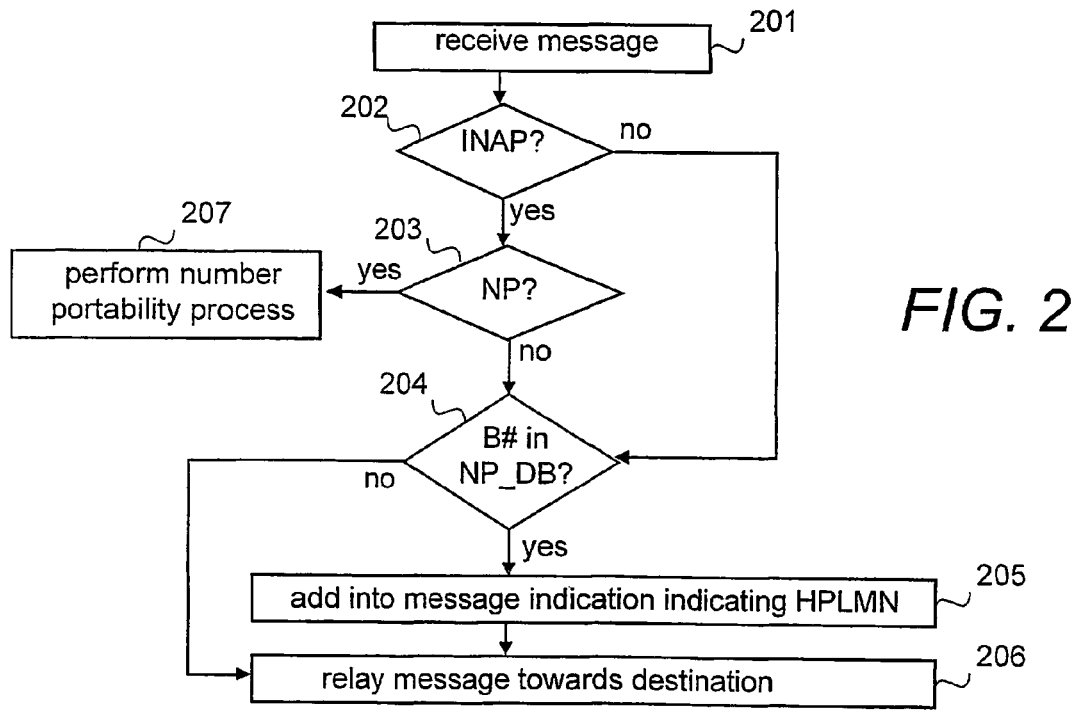
FIG. 2 is a flow chart illustrating the functionality of a service routing register in the first preferred embodiment of the invention.

FIG. 2 illustrates the functionality of SRR in the first preferred embodiment of the invention where the system is a mobile communications system supporting at least CAP and INAP (Intelligent Network Application Protocol), such as CoreINAP. For the sake of clarity, the term 'message' covers here also the terms 'service request' and 'operation' which are commonly used in the intelligent network instead of the term 'message'. In the example illustrated in FIG. 2, it is assumed, for clarity's sake, that the only service logic in SRR is the service logic for number portability. In other words, the requests relating to number portability are the only ones assumed to be answered by SRR in the first preferred embodiment of the invention. It is also assumed, for clarity's sake, that at least all ported numbers or addresses within a portability cluster are included in the Number Portability Database, i.e. direct routing is used as a routing convention. When the invention is applied to tariffing and direct routing is used, the Number Portability Database should include within the portability cluster at least all ported numbers or addresses affecting tariffing.

In the first preferred embodiment of the invention, two factors are determined. SRR uses these factors when deciding whether the received message is a message SRR should respond to or a message to be relayed.

The first factor determines the protocol(s) used to relay messages SRR should respond to. An example of such a protocol is INAP. Messages according to other protocols, not used by a standardized IN-based solution to perform a number portability request, such as CAP, are interpreted as messages to be relayed. In other words, with the first factor, protocols can be divided into protocols used for number portability enquiries and protocols not used for number portability enquiries in the first preferred embodiment.

The second factor determines within a protocol the used service key value(s) for the messages SRR should respond to, the service key value(s) indicating the service logic to be performed in SRR. In the first preferred embodiment of the invention, a service key value NP indicates that the service logic for number portability should apply and a message having another service key value is a message to be relayed. In other words, the service key value is used to decide whether SRR should respond to the message or whether the message is a message to be relayed. When SRR supports several protocols, the service key values may also be determined to each protocol separately.

With these two different factors a problem relating to service keys is solved. The service invocation request includes a service key or a corresponding parameter indicating the service logic the invocation relates to. The service key is added by SSP. However, the service key value for the number portability service is not standardized and the allocation of the value is not coordinated between different networks (operators). In some protocols, like CAP, the service key is administrated by the subscription network, i.e. home operator, in order to provide roaming subscribers intelligent services of the home network. In some protocols, such as INAP, the service key is administrated by network elements in the visited network. Thus a service key value given in a home network for a CAP service invocation request indicating a call barring can be the same service key value given in a visited network for number portability requests. This possible confusion is overcome by the first factor.

Referring to FIG. 2, SRR receives, in step 201, a message and determines, in step 202, whether the message is a message according to INAP, i.e. an INAP message. The determination of the protocol can be based on checking the Application Context of the message, for example. The Application Context comprises information on the used protocol. The information is unique in different intelligent network-like protocols and thus unambiguously indicates the protocol used by the message.

If the message is an INAP message (step 202), SRR checks, in step 203, whether the service key value in the message is NP, i.e. whether the service key indicates that service logic for number portability should apply.

If the service key is not NP, SRR maps the called party address to the number portability database. In other words, SRR checks, in step 204, whether the called party address B# is in the number portability database NP_DB.

If the called party address B# was in the number portability database NP_DB, the called party address is a ported address, and SRR adds, in step 205, into the message received in step 201, an indication indicating the subscription network HPLMN, i.e. an indication indicating the subscription network/number range owner of B#. The indication is preferably a prefix preceding the called party address and directly indicating HPLMN. The prefix is preferably the routing number of subscriber B. The routing number depends on the configuration of the network and it may be any number. The routing number may comprise the country code, for example. Other kinds of indications may also be used, such as parameters or replacing the called party address B# with a number indicating the right subscription network/number range owner. After the indication is added (step 205), SRR relays, in step 206, the message towards its destination address, i.e. towards the network node invoking the service, i.e. towards SCP comprising the service logic.

If the called party address B# was not in the number portability database NP_DB (step 204), the called party address is not a ported address and it indicates the right subscription network/number range owner. Then there is no need to modify the message and SRR thus proceeds to step 206 to relay the message towards its destination address.

If the service key was NP (step 203), SRR performs, in step 207, the number portability process, i.e. current subscription network ported status checking.

If the message was not an INAP message (step 202), it is in the first preferred embodiment of the invention a CAP message, and SRR proceeds to step 204 to check, whether B# is in NP_DB, continuing the process as described above.

When indirect routing is used as the routing convention, all HPLMN's own ported numbers (ported out and ported in) are in NP_DB and the others are not there. In that case, the called party address indicates the right subscription network/number range owner to HPLMN's own subscribers. However, the called party address of a visiting subscriber does not necessarily indicate the right subscription network/number range, since all ported numbers of other subscription networks (PLMNs) belonging to the same portability cluster with HPLMN are not in NP_DB. Therefore, the invention can be applied to 'off-network' and 'on-network' tariffing when indirect routing is used.

The steps in FIG. 2 are not in an absolute chronological order. For example, some of the above steps may take place simultaneously, or in another order. Some steps may be omitted, such as checking the service key value in embodiments where one protocol is used between SSP and SRR and another between SSP and SCP, i.e. in embodiments where the used protocol always indicates whether or not SRR should respond. In embodiments, where the same protocols are used between SSP, SRR and SCP, the determination of the used protocol may be omitted since it does not reveal whether or not a message is a message to be skipped over. Correspondingly, other steps not shown in FIG. 2 may take place between the above-mentioned steps, such as checking other service key value(s) for other services to be performed in SRR. Examples of other service logics in the SRR are caller address (i.e. A-number) validation and trigger information.

Figure 3:
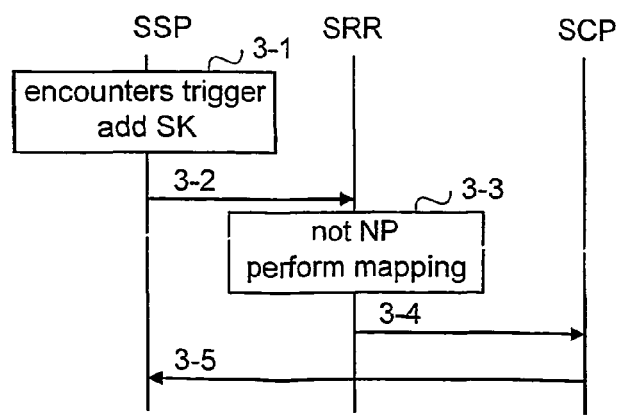
FIG. 3 illustrates signalling according to the first preferred embodiment of the invention.

FIG. 3 illustrates signalling according to the first preferred embodiment of the invention. SSP encounters a trigger, i.e. detects a service invocation, in point 3-1. In the example of FIG. 3, it is assumed that the detected service invocation (i.e. encountered trigger) relates to a prepaid service, and SSP adds a service key SK indicating the prepaid service in point 3-1 into the service invocation request. SSP adds the address of SCP into the service invocation request and all the information needed for the service triggering. Then SSP according to the invention sends the service invocation request in message 3-2 to SRR.

SRR receives message 3-2, finds out that message 3-2 is not a message relating to number portability NP and performs the B-number mapping against the number portability database (as described earlier with FIG. 2), in point 3-3, and modifies, if needed, the B-number to indicate the subscription network/number range owner as described earlier with FIG. 2. Then SRR relays the service invocation request in message 34 to SCP.

SCP recognizes in the example illustrated in FIG. 3 that message 34 relates to prepaid services and it notes the right indication about the tariff from B-number in message 34 since B-number indicates the subscription network/number range owner. Thus charging can be created in the system with a right tariff level based on the received called party address or prefixed called party address. After determining the threshold for the prepaid service, SCP sends the threshold (or some other instructions) directly to SSP in message 3-5.

In the first preferred embodiment of the invention the SSP uses the addressing of an SCCP (Signalling Connection Control Part) protocol so that an indication 'route on GT (Global Title)' causes the message to be routed towards SRR. SRR then performs GT translation according to SCCP, the outcome of which indicates the address of SCP. Another possibility is that the subscriber information or information relating to the service invocation contains a direct address to SRR and that address is used to route the request to SRR which then performs GT translation.

In one embodiment of the invention, SSP is configured to send only service invocation requests with B-number(s) via SRR and other service invocation requests directly to SCP. In another embodiment of the invention, SSP is configured to send only service invocation requests with predetermined B-number(s) via SRR and other service invocation requests directly to SCP. The predetermined B-numbers may comprise the numbers of home subscribers or numbers within the portability cluster, e.g. numbers comprising a certain country code, such as +358 for Finland. In yet another embodiment of the invention, SSP is configured to send only service invocation requests with B-numbers via SRR and other service invocation requests directly to SCP, the service invocation requests relating to certain short numbers, such as VPN-numbers (Virtual Private Numbers) are routed directly to SCP and others via SRR. Directly means either transparently via SRR or via direct connection between SSP and SCP.

Although the invention has been described above with a called party address, it is obvious to one skilled in the art how to apply the invention to services based on a caller's number range, i.e. on the number range of the calling address A. One example of such a service is barring based on a subscriber's telephone number's (MSISDN) country code.

Although the invention has been described above with mobile telecommunications system, it is obvious to one skilled in the art how to implement the invention in a fixed system where the invention can also be applied to determine the proper location.

Although the invention has been described above assuming that at least the used protocol or the service key indicating the service logic are used to decide whether the message is one to be relayed or one SRR should respond to, it is obvious to one skilled in the art that they are only examples of factors with which one can separate the messages. Also other factors with which SRR can recognize whether the message is one to be relayed or one to be responded to may be used instead of or in addition to the above-mentioned factors. For example, messages comprising the address of SCP may be the ones to be relayed and messages without the address of SCP the ones to be responded to.

Although the invention has been described above with CAP and INAP, it is obvious to one skilled in the art that the invention can be implemented with other protocols, including future protocols not known at the time the invention was made, which are used to initiate services.

Although the invention has been described above with Number Portability, it is obvious to one skilled in the art that the invention can be implemented with corresponding services, such as Logical Name Portability for IP Multimedia services, and even mapping of logical names without portability service when a streamlined function for mapping of a right tariff level from the logical name is needed. Here the term 'number portability' covers also this kind of mapping. The logical name, such as user@domain or an URL (Uniform Resource Locator) address, hides the actual IP-address.

It will be obvious to one skilled in the art that, as technology advances, the inventive concept can be implemented in various ways. The invention and its embodiments are not limited to the examples described above but may vary within the scope of the claims.

The invention claimed is:
1. A method comprising:
   detecting in a first entity a service invocation identifying a service that is to be invoked by a second entity;
   routing a service invocation request from the first entity to the second entity via a third entity, said service invocation request comprising a called party address;
   mapping, in the third entity, the called party address to a number portability database; and
   if the called party address is in the number portability database, adding, in the third entity, to the service invocation request an indication that indicates an address range of the called party address,
   if the called party address is not in the number portability database, the called party address indicates the address range;
   forwarding the service invocation request, that indicates the address range of the called party address, from the third entity to the second entity, the second entity determining a parameter for the service using the address range indicated in the service invocation request, when invoking the service, determining, by an apparatus in the third entity, that the request is to be forwarded to the second entity on the basis of the protocol used in the request; and performing said mapping if the request is to be forwarded to the second entity.

2. A method according to claim 1, further comprising:

adding a service key indicating the service into the request in response to detecting the service invocation;

determining in the third entity that the request is to be forwarded to the second entity on the basis of the service key in the request; and performing said mapping if the request is to be forwarded to the second entity.

3. A method according to claim 1, wherein the number portability database comprises information on at least ported addresses of home subscribers; and the address range indicates whether the subscriber is a home subscriber or a visiting subscriber.

4. A method according to claim 1, wherein the address range is used to determine a tariff level to be used.

5. A method comprising:

receiving, in a network node providing at least a number portability service using a number portability database, a service invocation request from a first entity, the service invocation request identifying a service which is to be invoked by a second node;

determining, by an apparatus in the network node, whether or not the service invocation request relates to services provided in the network node, the services including the number portability service;

if the service invocation request does relate to services provided in the network node, triggering the service the service invocation request relates to;

if the service invocation request does not relate to services provided in the network node, the method further comprises mapping a called party address in the service invocation request to the number portability database; and if the called party address is in the number portability database, adding to the service invocation request an indication that indicates an address range of the called party address, and if the called party address is not in the number portability database, the called party address indicates the address range; and forwarding the service invocation request that indicates the address range of the called party address to a second entity, the method further comprising recognizing that the message does not relate to services provided in the network node on the basis of the protocol of the service invocation request.

6. A method according to claim 5, further comprising:

recognizing that the service invocation request relates to services provided in the network node on the basis of a service key value in the service invocation request.

7. A method comprising:

receiving a service invocation request from a first entity in a network node, the network node providing, using a database, at least mapping of logical names with an address indicating a tariff level;

determining, by an apparatus in the network node, whether or not the service invocation request relates to services provided in the network node;

if the service invocation request does relate to services provided in the network node, triggering the service the service invocation request relates to;

if the service invocation request does not relate to services provided in the network node, the method further comprises performing the mapping to the address in the service invocation request, and if the address in the service invocation request is in the database, adding to the service invocation request an address indicating the tariff level, and if the address in the service invocation request is not in the database, the address in the service invocation request indicates the tariff level; and forwarding the service invocation request with the address indicating the tariff level to a second entity, the method further comprising recognizing that the message does not relate to services provided in the network node on the basis of the protocol of the service invocation request.

8. An apparatus comprising, comprising at least one processor; and at least one memory including computer program code, the at least one memory and the computer program code configured to, with the at least one processor, cause the apparatus to perform at least the following:

to provide a number portability service function having access to a number portability database;

in response to receiving a service invocation request from a first entity, the service invocation request identifying a service to be invoked by a second entity, to determine whether or not the service invocation request relates to a service function in the apparatus;

if the service invocation request does not relate to a service function in the apparatus, to map a called party address in the service invocation request to the number portability database;

if the called party address is in the number portability database, to add to the service invocation request an indication that indicates an address range of the called party address, where if the called party address is not in the number portability database, the called party address indicates the address range; and to cause the apparatus to forward the service invocation request indicating the address range of the called party address to a the second entity, wherein the processor is further configured to cause the apparatus to perform said determination by comparing the protocol used to forward the service invocation request with protocols used by service functions in the apparatus, and to determine that the service invocation request does not relate to a service function in the apparatus, if the protocol is not one of the protocols used by service functions in the apparatus.

9. The apparatus according to claim 8, wherein if the protocol is one of the protocols used by service functions, the processor is further configured to check, whether a service key in the service invocation request indicates one of the service functions in the apparatus and to determine that the service invocation request does not relate to a service function in the apparatus, if the service key does not indicate one of the service functions in the apparatus.

10. The apparatus according to claim 8, wherein the processor is further configured to cause the apparatus to perform said determination by checking, whether a service key in the service invocation request indicates one of the service functions in the apparatus and to determine that the service invocation request does not relate to a service function in the apparatus, if the service key does not indicate one of the service functions in the apparatus.

11. A system comprising:
a first node configured to encounter a trigger identifying a service that is to be invoked by a second node and, in response to the encountering, sending a service invocation request;
the second node configured to invoke the service; and
a third node having access to a memory comprising a number portability database that comprises ported numbers, and is configured to provide at least a number portability service;
wherein the first node is configured to send the service invocation request to the second node via the third node; and the third node comprises a processor configured to
determine whether or not the service invocation request relates to services provided in the third node, and
if the service invocation request does not relate to services provided in the third node, the third node is configured to
map a called party address in the service invocation request to the number portability database, and
if the called party address is in the number portability database, the processor is configured to add to the service invocation request an indication that indicates an address range of the called party address, and
if the called party address is not in the number portability database, the called party address indicates the address range, and
the processor being further configured to
forward the service invocation request to the second node, the forwarded service invocation request indicating the address range of the called party address; and
wherein the second node is configured to determine a parameter for the service using the address range indicated in the service invocation request, when invoking the service.

12. An apparatus comprising, comprising at least one processor; and at least one memory including computer program code and a number portability database, the at least one memory and the computer program code configured to, with the at least one processor, cause the apparatus to perform at least the following:
in response to receiving a service invocation request from a first entity, the service invocation request identifying a service to be invoked by a second entity, to determine whether or not the service invocation request relates to a service function in the apparatus;
if the service invocation request does not relate to a service function in the apparatus, to map an address in the service invocation request to the number portability database;
if the address is in the number portability database, to add to the service invocation request an indication that indicates an address range of the called party address, where if the address is not in the number portability database, the address in the service invocation request indicates the address range; and
to forward the service invocation request indicating the address range of the address to a second entity
wherein the processor is further configured to cause the apparatus to perform said determination by comparing the protocol used to forward the service invocation request with protocols used by service functions in the network node, and to determine that the service invocation request does not relate to a service function in the apparatus, if the protocol is not one of the protocols used by service functions in the apparatus.

13. The apparatus according to claim 12, wherein if the protocol is one of the protocols used by service functions, the processor is further configured to cause the apparatus to check whether a service key in the service invocation request indicates one of the service functions in the apparatus and to determine that the service invocation request does not relate to a service function in the apparatus, if the service key does not indicate one of the service functions in the apparatus.

14. The apparatus according to claim 12, wherein the processor is further configured to cause the apparatus to perform said determination by checking whether a service key in the service invocation request indicates one of the service functions in the apparatus and to determine that the service invocation request does not relate to a service function in the apparatus, if the service key does not indicate one of the service functions in the apparatus.

15. A computer program, embodied on a computer-readable medium, the computer program configured to control a processor to perform a method comprising:
receiving, in a network node providing at least a number portability service using a number portability database, a service invocation request from a first entity, the service invocation request identifying a service which is to be invoked by a second node;
determining whether or not the service invocation request relates to services provided in the network node, the services including the number portability service;
if the service invocation request does relate to services provided in the network node, triggering the service the service invocation request relates to;
if the service invocation request does not relate to services provided in the network node, the method further comprises
mapping a called party address in the service invocation request to the number portability database; and
if the called party address is in the number portability database,
adding to the service invocation request an indication that indicates an address range of the called party address, and
if the called party address is not in the number portability database, the called party address indicates the address range;
forwarding the service invocation request that indicates at least the address range of the called party address to a second entity; and
recognizing that the message does not relate to services provided in the network node on the basis of the protocol of the service invocation request.

16. A computer program according to claim 15, the method further comprising:
recognizing that the service invocation request relates to services provided in the network node on the basis of a service key value in the service invocation request.

17. A computer program, embodied on a computer-readable medium, the computer program configured to control a processor to perform a method comprising:
receiving a service invocation request from a first entity in a network node, the network node providing, using a database, at least mapping of logical names with an address indicating a tariff level;

determining whether or not the service invocation request relates to services provided in the network node;

if the service invocation request does relate to services provided in the network node, triggering the service the service invocation request relates to;

if the service invocation request does not relate to services provided in the network node, the method further comprises performing the mapping to the address in the service invocation request; and if the address in the service invocation request is in the database, adding to the service invocation request an address indicating the tariff level, and if the address in the service invocation request is not in the database, the address in the service invocation request indicates the address range;

forwarding the service invocation request with an address indicating the tariff level to a second entity; and recognizing that the message does not relate to services provided in the network node on the basis of the protocol of the service invocation request.

18. A computer program according to claim 17, the method further comprising:

recognizing that the service invocation request relates to services provided in the network node on the basis of a service key value in the service invocation request.

* * * * *